United States Patent
Herz et al.

(10) Patent No.: US 11,727,678 B2
(45) Date of Patent: Aug. 15, 2023

(54) METHOD AND APPARATUS FOR IMAGE RECOGNITION IN MOBILE COMMUNICATION DEVICE TO IDENTIFY AND WEIGH ITEMS

(71) Applicant: Tiliter Pty Ltd., Sydney (AU)

(72) Inventors: Marcel Herz, Sydney (AU); Christopher Bradley Rodney Sampson, Sydney (AU)

(73) Assignee: Tiliter Pty Ltd., Sydney (AU)

( * ) Notice: Subject to any disclaimer, the term of this patent is extended or adjusted under 35 U.S.C. 154(b) by 198 days.

(21) Appl. No.: 17/085,582

(22) Filed: Oct. 30, 2020

(65) Prior Publication Data
US 2022/0138465 A1     May 5, 2022

(51) Int. Cl.
| | | |
|---|---|---|
| *G06V 20/10* | (2022.01) | |
| *G06T 7/70* | (2017.01) | |
| *G06N 3/04* | (2023.01) | |
| *G06V 20/62* | (2022.01) | |
| *G10L 13/02* | (2013.01) | |
| *G06Q 30/0283* | (2023.01) | |
| *G06F 9/54* | (2006.01) | |

(Continued)

(52) U.S. Cl.
CPC .............. *G06V 20/10* (2022.01); *G06F 9/541* (2013.01); *G06F 18/21* (2023.01); *G06F 18/24* (2023.01); *G06N 3/04* (2013.01); *G06Q 30/0283* (2013.01); *G06T 7/70* (2017.01); *G06V 10/40* (2022.01); *G06V 20/62* (2022.01); *G06V 20/68* (2022.01); *G06V 30/10* (2022.01); *G10L 13/02* (2013.01); *G06Q 20/322* (2013.01); *G06T 2207/30204* (2013.01)

(58) Field of Classification Search
CPC ........ G06V 20/10; G06V 10/40; G06V 20/62; G06T 7/70; G06F 9/541; G06K 9/6217; G06K 9/6267; G06N 3/04
See application file for complete search history.

(56) References Cited

U.S. PATENT DOCUMENTS

| | | |
|---|---|---|
| 10,043,168 B1 | 8/2018 | Catoe et al. |
| 10,296,814 B1 * | 5/2019 | Kumar ................. G06K 9/6267 |

(Continued)

FOREIGN PATENT DOCUMENTS

CN     111814660 A     10/2020

OTHER PUBLICATIONS

International Search Report and Written Opinion for International Application No. PCT/IB2021/060066, dated Jan. 10, 2022, 11 pages.

*Primary Examiner* — Utpal D Shah
(74) *Attorney, Agent, or Firm* — Cooley LLP

(57) ABSTRACT

In some embodiments, a method can include executing a first model to extract a first region of interest (ROI) image and a second ROI image from an image that shows an item and an indication of information associated to the item. The first ROI image can include a portion of the image showing the item and the second ROI image can include a portion of the image showing the indication of information. The method can further include executing a second model to identify the item from the first ROI image and generate a representation of the item. The method can further include executing a third model to read the indication of information associated to the item from the second ROI image and generate a representation of information.

18 Claims, 5 Drawing Sheets

(51) Int. Cl.
*G06V 10/40* (2022.01)
*G06V 20/68* (2022.01)
*G06V 30/10* (2022.01)
*G06F 18/21* (2023.01)
*G06F 18/24* (2023.01)
G06Q 20/32 (2012.01)

(56) References Cited

U.S. PATENT DOCUMENTS

| | | |
|---|---|---|
| 11,393,253 B1* | 7/2022 | Maron .................. G06T 7/248 |
| 11,423,075 B2* | 8/2022 | Morate ............... G06F 16/5854 |
| 2007/0158417 A1 | 7/2007 | Brewington |
| 2010/0059589 A1 | 3/2010 | Goncalves et al. |
| 2015/0370889 A1* | 12/2015 | Chiba .................... G06V 20/62 |
| | | 382/176 |
| 2016/0342863 A1 | 11/2016 | Kwon et al. |
| 2019/0156157 A1* | 5/2019 | Saito .................. G06V 40/169 |
| 2019/0303708 A1* | 10/2019 | Kim ...................... G06V 10/20 |
| 2020/0111053 A1* | 4/2020 | Bogolea ............... G06K 9/6215 |
| 2020/0184411 A1* | 6/2020 | Shah .................... G05D 1/0274 |
| 2020/0192608 A1 | 6/2020 | Pang et al. |
| 2021/0303939 A1* | 9/2021 | Hu ...................... G06V 10/255 |
| 2021/0390673 A1* | 12/2021 | Ban ........................ G06T 7/194 |
| 2022/0230216 A1* | 7/2022 | Buibas .................... G06T 7/97 |

* cited by examiner

200

Execute, at a first compute device, a first model to extract a first region of interest (ROI) from an image and a second ROI image from the image. The image can show an item and an indication of information associated to the item. The first ROI image can include a portion of the image showing the item and the second ROI image can include a portion of the image showing the indication of information 201

Execute a second model to identify the item from the first ROI image and generate a representation of the item 202

Execute a third model to read the indication of information associated to the item from the second ROI and generate a representation of information 203

Transmit, via an application programming interface (API), the representation of the item and the representation of information to a second compute device remote from the first compute device, the second compute device configured to calculate a price of the item based on the representation of the item or the representation of information 204

FIG. 2

METHOD AND APPARATUS FOR IMAGE RECOGNITION IN MOBILE COMMUNICATION DEVICE TO IDENTIFY AND WEIGH ITEMS

TECHNICAL FIELD

The present disclosure relates to the field of artificial intelligence, and in particular to apparatus and methods for using computer vision in mobile communication devices to identify and weigh items.

BACKGROUND

Respiratory viral infections such as, for example, influenza and coronavirus are significant cause of respiratory disease worldwide. Most recently, the coronavirus disease 2019 (COVID-19) pandemic has caused numerous infections and was recognized as a pandemic by the World Health Organization (WHO) in March 2020. As of September 2020, there has been over 33 million cases of infection and over a million death recorded worldwide. Such viral infections can spread out in communities via a number of ways including air or physical contact. Some of daily routines in urban-living style involve physical contacts that can be sufficient to expose individuals and communities to a risk of infection. Thus, a need exists for apparatus and methods to reduce physical contact in our daily routines.

SUMMARY

In some embodiments, a method can include executing a first model to extract a first region of interest (ROI) image and a second ROI image from an image that shows an item and an indication of information associated to the item. The first ROI image can include a portion of the image showing the item and the second ROI image can include a portion of the image showing the indication of information. The method can further include executing a second model to identify the item from the first ROI image and generate a representation of the item. The method can further include executing a third model to read the indication of information associated to the item from the second ROI image and generate a representation of information.

BRIEF DESCRIPTION OF THE DRAWINGS

FIG. 2 is a flowchart showing a method of image recognition, according to an embodiment.

DETAILED DESCRIPTION

Non-limiting examples of various aspects and variations of the embodiments are described herein and illustrated in the accompanying drawings.

Described herein are recognition devices and methods that are suitable for highly reliable recognition of an item and information associated to the item in an image. In particular, recognition devices and methods described herein can generate a representation of the item and a representation of the information about the item to be used in a calculation, a payment, a decision making, and/or the like. For example, the recognition devices and methods described herein can identify a produce item on a scale and an indication of a weight of the produce item shown on the scale using a personal mobile communication device (e.g., a personal cell phone) to make a payment at grocery store without making contact with a sales representative, a scale, self-check-out device, and/or the like.

Recognition of items and information associated to those items is a challenging task, in part, because, images of items (e.g., produce) and/or images of information associated to the items (e.g., digits showing an indication of a weight) can have a wide range of variety in color, texture, lighting, marking, bags, background, and/or other factors because of the wide variety in characteristics of types of produce and types of environment in which the images of produce are taken. Therefore, recognition devices that can perform image recognition tasks in the domain of images of items can encounter a challenging environment. To solve that challenge, recognition devices and methods described herein include models that identify and extract regions of interest, identify an item to generate a representation of the item, identify information about the item (e.g., an indication of weight of the item), and generate a representation of the information. The recognition devices and methods can optionally calculate a price of the item and process a payment based on the price.

While the methods and apparatus are described herein as processing data from a set of files, a set of images, a set of videos, a set of databases, and/or the like, in some instances a recognition device (e.g., recognition device 101 discussed below in connection with FIG. 1) can be used to generate the set of files, the set of images, the set of videos, a set of text, a set of numbers, and/or the set of databases. Therefore, the recognition device can be used to process and/or generate any collection or stream of data, events, and/or objects. As an example, the recognition device can process and/or generate any string(s), number(s), image(s), video(s), executable file(s), dataset(s), and/or the like. For further examples, the recognition device 101 can be used to execute, compile, or process an application programming interface (API), a function(s) of a software code(s), a data file(s), a data stream(s), a model file(s), a source file(s), a script(s), and/or the like.

Figure 1:
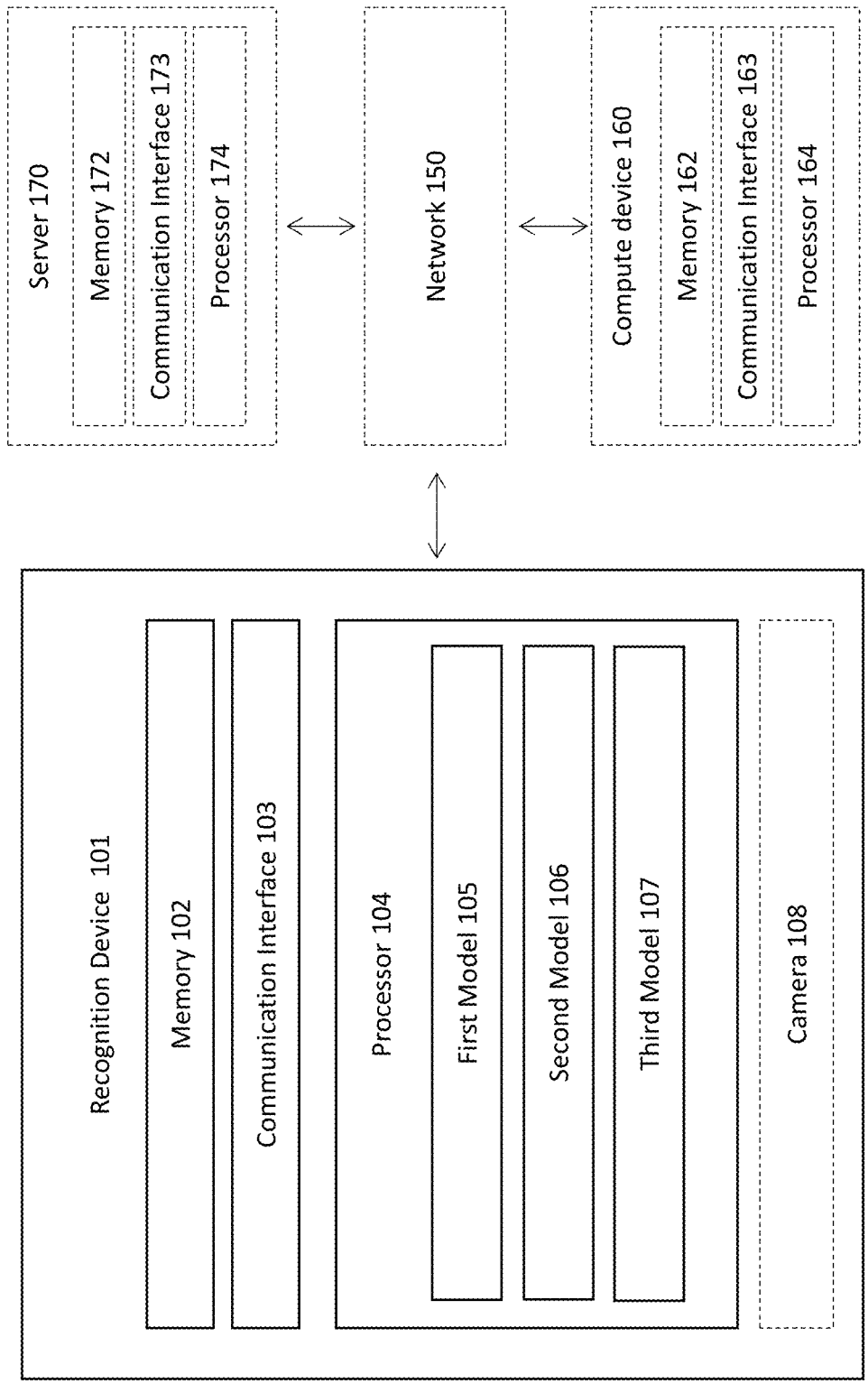
FIG. 1 is a schematic description of a recognition device, according to an embodiment.

FIG. 1 is a schematic description of a recognition device 101, according to an embodiment. The recognition device 101 includes hardware and/or software to perform (or execute) a first model 105, a second model 106, and/or a third model 107 that collectively identify an item and information about the item, in an image. In particular the recognition device 101 can be a personal device that is in physical contact with a user and not a sales representative. For example, the recognition device 101 can be, include, or be integrated to a mobile phone, a virtual reality headset, a personal assistant device, a wearable compute device (such as a smart watch), a tablet, and/or any device that the user can carry to a grocery store for shopping. The recognition device 101 can optionally include a camera 108 that captures the image. The recognition device 101 can optionally calculate a price for the item and/or process a payment for purchasing the item. The recognition device 101 can be operatively coupled to a compute device 160 and/or a server 170 to transmit and/or receive data and/or analytical models via a network 150. The compute device 160 and the server 170 each can be/include a hardware-based computing device and/or a multimedia device, such as, for example, a server, a workstation, a computer, a desktop, a laptop, a smartphone, a tablet, a wearable compute device, and/or the like.

The recognition device 101 includes a memory 102, a communication interface 103, and a processor 104. In some embodiments, the recognition device 101 can receive data including a set of images, a set of text data, a set of numerical data, a model from a data source. In some instances, the recognition device 101 can receive a set of videos from the data source and analyze the set of videos frame by frame to generate the set of images of produce. The data source can be or include, for example, an external hard drive operatively coupled to the recognition device 101, the compute device 160, the server 170, and/or the like. In some embodiments, the recognition device 101 can be configured to capture the set of images, record the set of text data or the set of numerical data, and/or generate the model.

The memory 102 of the recognition device 101 can be, for example, a memory buffer, a random access memory (RAM), a read-only memory (ROM), a hard drive, a flash drive, a secure digital (SD) memory card, an external hard drive, an erasable programmable read-only memory (EPROM), an embedded multi-time programmable (MTP) memory, an embedded multi-media card (eMMC), a universal flash storage (UFS) device, and/or the like. The memory 102 can store, for example, the set of images, the set of text data, the set of numerical data, the model(s), and/or code that includes instructions to cause the processor 104 to perform one or more processes or functions (e.g., a first model 105, a second model 106, and/or a third model 107).

In some implementations, the memory 102 can store a set of files associated with (e.g., generated by executing) the first model 105, the second model 106, and/or the third model 107. The set of files associated can include data generated by the first model 105, the second model 106, and/or the third model 107 during an operation of the recognition device 101. For example, the set of files associated with the first model 105, the second model 106, and/or the third model 107 can include temporary variables, return memory addresses, variables, a graph of the first model 105, the second model 106, and/or the third model 107 (e.g., a set of arithmetic operations or a representation of the set of arithmetic operations used by the first model 105, the second model 106, and/or the third model 107), the graph's metadata, assets (e.g., external files), electronic signatures (e.g., specifying a type of model being exported, and the input/output tensors), and/or the like, generated during the operation of the recognition device 101.

The communication interface 103 of the recognition device 101 can be a hardware component of the recognition device 101 to facilitate data communication between the recognition device 101 and external devices (e.g., the compute device 160, the server 170, peripheral devices, and/or the like) or internal components of the recognition device 101 (e.g., the memory 102, the processor 104, the camera 108). The communication interface 103 is operatively coupled to and used by the processor 104 and/or the memory 102. The communication interface 103 can be, for example, a network interface card (NIC), a Wi-Fi® module, a Bluetooth® module, an optical communication module, and/or any other suitable wired and/or wireless communication interface. The communication interface 103 can be configured to connect the recognition device 101 to the network 150. In some instances, the communication interface 103 can facilitate receiving or transmitting data via the network 150. For example, in some embodiments, the communication interface 103 can facilitate receiving or transmitting the set of images, the set of text data, the set of numerical data, the first model 105, the second model 106, the third model 107, and/or the like through the network 150 from/to the user device 160 or the server 170, each communicatively coupled to the recognition device 101 via the network 150.

The processor 104 can be, for example, a hardware based integrated circuit (IC) or any other suitable processing device configured to run or execute a set of instructions or a set of codes. For example, the processor 104 can include a general purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC), a graphics processing unit (GPU), a neural network processor (NNP), a SOC (System on a Chip), SOM (System on a Module), and/or the like. The processor 104 can be operatively coupled to the memory 102 and/or communication interface 103 through a system bus (for example, address bus, data bus, and/or control bus; not shown).

The processor 104 includes the first model 105 (also referred to as the 'region of interest (ROI) extraction model'), the second model 106 (also referred to as the 'image identification model'), and the third model 107 (also referred to as the 'marker detection model'). Each of the first model 105, the second model 106, or the third model 107 can include software stored in the memory 102 and executed by the processor 104. For example, a code to cause the first model 106 to generate a first ROI and a second ROI can be stored in the memory 102 and executed by the processor 104. Alternatively, each of the first model 105, the second model 106, or the third model 107 can be a hardware-based device. For example, a process to cause the third model 107 to detect markers and generate a representation of information about an item can be implemented on an individual integrated circuit chip.

In some embodiments, the processor 104 can optionally include a data preprocessor to receive and prepare data including the set of images, the set of text data, and/or the set of numerical data. In some instances, preparing the data can involve normalizing the data to a common scale (same file format, same image size, same physical units, and/or the like) for analyzing the data in a cost efficient and accurate manner. In some instances, preparing the data can involve color casting images of the data. For example, in some instances, the images can be converted to a grayscale image. In some instances, preparing the data can involve augmenting the data to diversify representations of the data and increasing data for training robust models (e.g., a neural network model used in the first model 105).

The first model 105 can be or include a procedural process model and/or a machine learning model configured to receive an image and extract one or more regions of interest (ROI) from the image. In some instances the first model 105 includes a neural network model with a set of model parameters such as a weight(s), a bias(s), or an activation function(s) that can be executed to generate one or more ROI from the image. For example, the first model 105 can be or include a convolutional neural network (CNN) model that includes a pooling layer. In some instances the first model 105 can include a procedural process model that executes image processing techniques on the image such as, for example, converting the image to a grayscale image, removing noise from an image and finding edges in the image, and/or the like. The first model 105 can extract a first ROI including an item (e.g., a produce on a scale) and a second ROI including information about the item (e.g., an indication of weight of the produce shown on a scale).

The second model 106 (e.g., the image identification model) can be configured to receive the first ROI, identify the item from the first ROI image and generate a representation of the item. In some instances the second model 106 includes a neural network model with a set of model parameters such as a weight(s), a bias(s), or an activation function(s) that can be executed to identify the item from the first ROI image and generate a representation of the item upon receiving the first ROI from the first model 105. The representation of the item can be, for example, a text indicating in natural language what the item is (e.g., apple, eggplant, watermelon, and/or the like). The representation of the item can be, for example, a serial number identifying the item on a look up table. In some instances, the second model 106 can be or include a deep neural network model that is previously trained on numerous images (1,000 images, 100,000 images, 10,000,000 million images, and/or the like) of items, each image from the numerous images labeled with a representation of the item. In some instances the second model 106 can include a procedural process model that executes image processing techniques on the first ROI such as, for example, filtering the image, feature descriptor, and/or the like.

The third model 107 (e.g., the marker detection model) can be configured to receive the second ROI, identify an information (e.g., an indication of weight, and indication of volume, an indication of material, and/or the like) about the item from the second ROI image and generate a representation of the information. In some instances the third model 107 includes a neural network model with a set of model parameters such as a weight(s), a bias(s), or an activation function(s) that can be executed to identify the information about item from the second ROI and generate a representation of the information about the item upon receiving the second ROI from the first model 105 and/or, in some instances, upon receiving the representation of the item from the second model 106. The representation of the information about the item can be or include, for example, a number indicating a characteristic of the item (e.g., 1, 100, 0.8, and/or the like). In some instances, the representation of the information about the item can include a unit of the number (e.g., kilogram, milliliter, purity, and/or the like).

In some instances, the third model 107 can be or include an image recognition model (e.g., deep neural network model) that is previously trained on numerous images (1,000 images, 100,000 images, 10,000,000 images, and/or the like) of information of items, each image from the numerous images labeled with a representation of an information about an item in that image. In some instances the third model 107 can include a procedural process model that executes image processing techniques on the first ROI such as, for example, optical character recognition (OCR) model, fuzzy logic controller, and/or the like. In some embodiments, the third model 107 can identify an indication of a sequence of letters or an indication of a sequence of numbers in the second ROI image. Then the third model 107 can convert the indication of sequence of letters to text data or the indication of sequence of numbers to numerical data. Thereafter, the third model 107 can generate the representation of the information based on the text data and the numerical data.

As stated above, in some embodiments, the first model 105, the second model 106, and/or the third model 107 each can include at least one machine learning model. The at least one machine learning model can be or include an artificial neural network (ANN) model, a fully connected neural network, a convolutional neural network (CNN), a generative adversarial network (GAN), a K-Nearest Neighbors (KNN) model, a Support Vector Machine (SVM), a decision tree, and/or the like.

In some implementations, the second model 106 can receive the first ROI from the first model 105 and identify an item of a first type and an item of second type in the first ROI (i.e., in the image). In some implementations, the third model 107 can receive the second ROI from the first model 105 and identify an information about the item that is above or below a preset threshold (e.g., a permitted weight). The recognition device 101 can generate a warning message about identification of multiple types of items in the image. For example, the recognition device 101 can generate a warning message about identification of multiple types of times in the image when the information identified by the third model 107 is above or below the preset threshold. The recognition device 101 can further send a signal to a compute device of a sales representative (e.g., grocery store checkout clerk) about the identification of multiple types of items and/or the information. The recognition device 101 can further trigger validation of the identification of multiple types of items and/or the information. For example, the recognition device 101 can be configured to prompt a sales representative to identify the item or items in the image and/or verify the information, and save sales representative's response in the memory 102 for tuning the first model 105.

In some embodiments, the recognition device 101 can optionally include a fourth model (not shown) that can be configured to classify the item from the first ROI image to a bagged item or non-bagged item. For example, in some instances, the item can include bagged produce and the fourth model can classify the item as bagged produce. In some instances, an indication of weight of produce can be adjusted based on classification of the produce to take into account an indication of weight of a bag of the bagged produce. In some embodiments the fourth model may include a machine learning model similar to any of the machine learning models of the produce classification device described in U.S. patent application Ser. No. 17/085,585, entitled "Methods and Apparatus for Training a Classification Model Based on Images of Non-bagged Produce or Images of Bagged Produce Generated by a Generative Model", which is incorporated herein in its entirety by this reference. In yet other embodiments, the recognition device (e.g., recognition device 101) can optionally integrate a bag type classification model into the image identification model (e.g., second model 106) to produce a concurrent model that performs concurrently bag type classification and image identification.

In some embodiments, the recognition device 101 can execute a text-to-speech model to convert text data and/or the numerical data generated by the second model 106 and/or third model 107 to speech data (e.g., an audio signal). The recognition 101 device can be further configured to play back the speech data.

In some embodiments, the recognition device 101 can optionally transmit (e.g., after training) the first model 105, the second model 106, and/or the third model 107 to the compute device 160 and/or the server device 170.

The compute device 160 can be/include a hardware-based computing device and/or a multimedia device operatively coupled to the recognition device 101. The compute device 160 can be configured to transmit and/or receive data and/or analytical models to/from the recognition device 101. For example, in some implementations, the compute device 160 can be a device at a grocery store that receives from the recognition device 101 and/or the server 170 a representation of the item and a representation of information (e.g., weight) about the item. The compute device 160 can receive the representation of the item and the representation of information about the item, for example, via an application program (API). In some instances, the compute device 160 can optionally calculate a price for the item based on the representation of the item and/or the representation of information about the item. In some instances, the compute device 160 can optionally process a payment (e.g., using a credit card(s), a bank account transaction(s), a bitcoin(s), a digital currency(ies), and/or the like) based on the price.

In some implementations, the recognition device 101 can calculate the price and transmit the price to the compute device 160 to process the payment. In some implementations, the recognition device 101 can process the payment and transmit a confirmation of the payment to the compute device 160. The compute device 160 can include a memory 162, a communication interface 163 and/or a processor 164 that are structurally and/or functionally similar to the memory 102, the communication interface 103 and/or the processor 104 as shown and described with respect to the recognition device 101.

The server 170 can be/include a compute device medium particularly suitable for data storage purpose and/or data processing purpose and can include, for example, a network of electronic memories, a network of magnetic memories, a server(s), a blade server(s), a storage area network(s), a network attached storage(s), deep learning computing servers, deep learning storage servers, and/or the like. The server 170 can include a memory 172, a communication interface 173 and/or a processor 174 that are structurally and/or functionally similar to the memory 102, the communication interface 103 and/or the processor 104 as shown and described with respect to the recognition device 101. In some instances, however, the memory 172 can include application specific storage (e.g., deep learning storage servers) that is structurally and/or functionally different from the memory 102. Similarly, in some instances, the processor 174 can include application-specific processors (e.g., GPU rack servers) that are structurally and/or functionally different from the memory 102.

The network 150 can be a digital telecommunication network of servers and/or compute devices. The servers and/or computes device on the network can be connected via one or more wired or wireless communication networks (not shown) to share resources such as, for example, data storage and/or computing power. The wired or wireless communication networks between servers and/or compute devices of the network 150 can include one or more communication channels, for example, a radio frequency (RF) communication channel(s), an extremely low frequency (ELF) communication channel(s), an ultra-low frequency (ULF) communication channel(s), a low frequency (LF) communication channel(s), a medium frequency (MF) communication channel(s), an ultra-high frequency (UHF) communication channel(s), an extremely high frequency (EHF) communication channel(s), a fiber optic commination channel(s), an electronic communication channel(s), a satellite communication channel(s), and/or the like. The network 150 can be, for example, the Internet, an intranet, a local area network (LAN), a wide area network (WAN), a metropolitan area network (MAN), a worldwide interoperability for microwave access network (WiMAX®), any other suitable communication system, and/or a combination of such networks.

In some implementations, the recognition device 101 can optionally be coupled to a set of peripheral devices (not shown) to receive data and/or commands. The peripheral device can include, for example, a webcam(s), a security camera(s), a mouse(s), a keyboard(s), an external hard drive(s), and/or the like. The recognition device 101 can receive the set of images, the set of text data, and/or the like, or a portion of the set of images, the set of text data, and/or the like from the peripheral devices.

Although the recognition device 101, the compute device 160, and the server 170 are shown and described as singular devices, it should be understood that, in some embodiments, one or more prediction devices, one or more compute device, and/or one or more server devices can be used in a recognition system.

FIG. 2 is a flowchart showing a method 200 of image recognition, according to an embodiment. In some implementations, a recognition device (such as the recognition device 101 as shown and described with respect to FIG. 1) can be used to perform the method 200. At 201, the recognition device can execute, at a first compute device (the recognition device), a first model (such as the first model 105 as shown and described with respect to FIG. 1) to extract a first region of interest (ROI) from an image and a second ROI image from the image. The image can show an item (e.g., a produce item) and an indication of information (e.g., indication of weight of the item) associated to the item. The first ROI image can include a portion of the image showing the item and the second ROI image can include a portion of the image showing the indication of information. At 202, the recognition device can execute a second model (such as the second model 106 as shown and described with respect to FIG. 1) to identify the item from the first ROI image and generate a representation of the item. For example, in some instances, the representation of the item can be a text that identifies a produce item (e.g., an apple) from the first ROI.

At 203, the recognition device can execute a third model to read the indication of information associated with the item from the second ROI and generate a representation of information. For example, in some instances, the representation of information can include a numerical data value indicating a quantity associated with the item and/or a text data that defines a unit for the quantity associated with the item. For example, the representation of information can include '1.23' as the quantity and 'kg' as the unit for the quantity. At 204, the recognition device can optionally transmit the representation of the item and/or the representation of information to a second compute device (compute device of a sales representative, a self-checkout device, and/or the like) remote from the first compute device. The recognition device can transmit the representation of the item and/or the representation of information about the item to the compute device, for example, via an API. In some instances, the second compute device can be configured to calculate a price of the item(s) based on the representation of the item(s) and/or the representation of information. In some embodiments the second compute device can further process a payment based on at least the price.

Although, in some embodiments described above, multiple models (e.g., the first model, the second model, and the third model) are used to perform extraction of regions of interest, identification of item, and marker detection, in some embodiments, the multiple models can be implanted in a concurrent model. In such embodiments, the recognition device can execute the concurrent model to: (a) extract a first region of interest (ROI) including a portion of the image with the item, (b) identify the item from the first ROI and generate a representation of the item, (c) extract a second ROI including a portion of the image with the indication of information, and (d) read the indication of weight associated to the item from the second ROI and generate a representation of weight.

Figure 3:
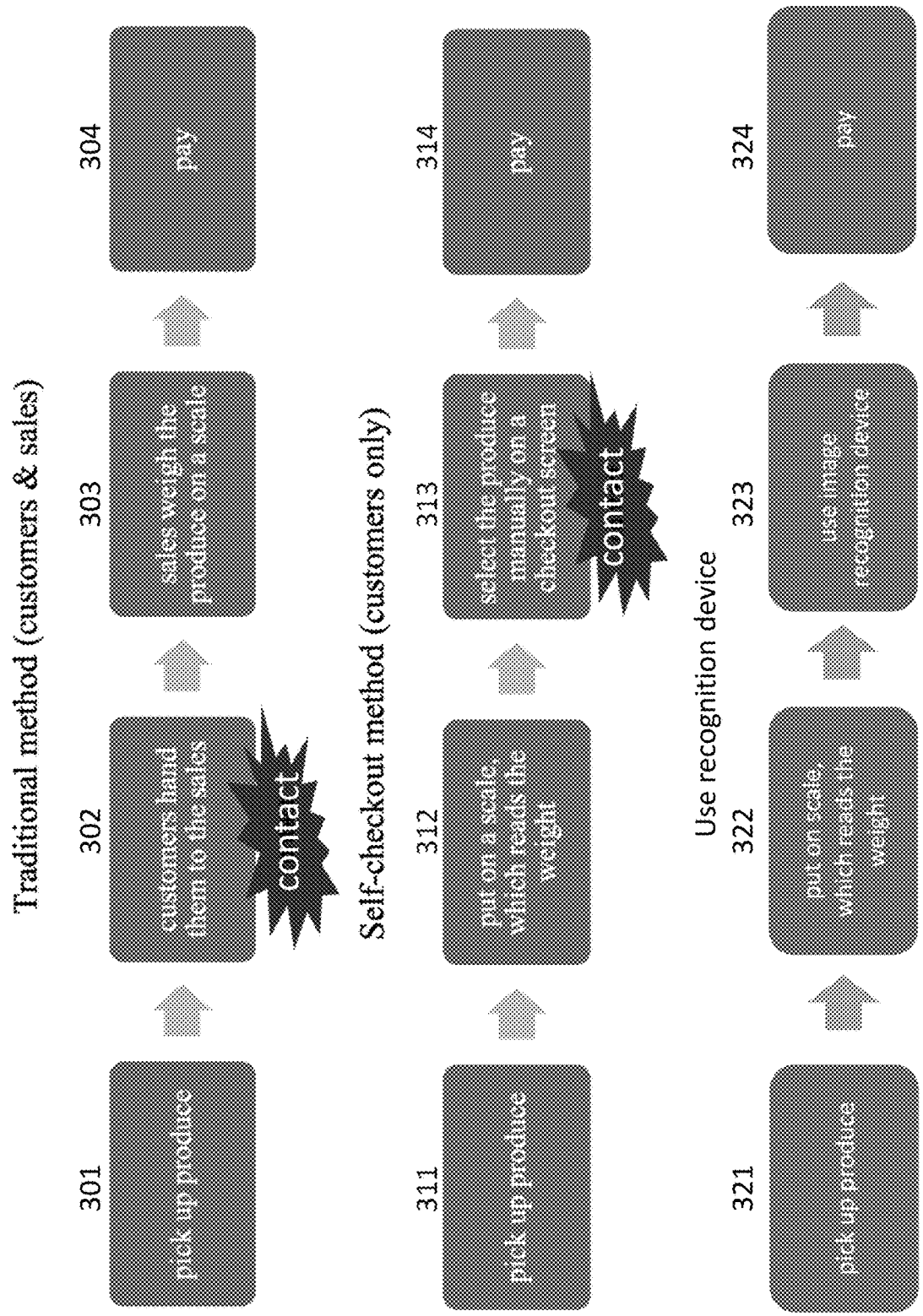
FIG. 3 a schematic description showing advantage of using a recognition device in contactless purchasing, according to an embodiment.

FIG. 3 a schematic description of advantage of using a recognition device, according to an embodiment. Purchasing an item (e.g., a produce, a bottle of juice, a shirt, and/or the like) in a store can be performed using methods that involve making direct or indirect physical contact between individuals. In some instances, in a known method, a customer can pick up 301 the item and hand the item to a sales representative 302. The sales representative can then weigh the produce on a scale 303 and process a payment 304. In the known method, a contact can happen when the customer hands the item to the sales representative. For example, the contact can be an indirect contact when the customer touches the item at a first time, puts the item in the cart, and the sales representative touches the item at a second time. Handing the item to the sales representative directly or indirectly can expose both the customer and the sales representative to a risk of infection.

In some other instances, in a self-checkout method, the customer can pick up the item 311 and place the item on a scale that generates a number based on a weight of the item 312. The customer can then continue by selecting the produce manually on a checkout screen 313 and process the payment 314. In the self-checkout method a contact can also happen when the customer touches the checkout screen. Because the screen can be used by any customer in the store, the self-checkout method can also expose the customer, other customers, and/or the sales representatives to a risk of infection.

In some yet other instances, the recognition device (similar to the recognition device 101 as shown and describe with respect to FIG. 1) can be used. In a recognition device method the customer can pick up the item 321 and place the item on a scale that generates a number based on a weight of the item 322. The customer can then use the recognition device (e.g., a personal cell phone that can be or include the recognition device) 323 to capture or receive an image showing the item and weight of item displayed on a screen of the scale, and generate a representation of the item and a representation of the weight of the item. The representation of the item and the representation of the weight can be used by the recognition device or a sales representative device that can be coupled to the recognition device to generate a price of the item and process a payment 324 based on the price. Therefore, the recognition device can be used to purchasing the item without making any direct or indirect physical contact with individuals.

Figure 4:
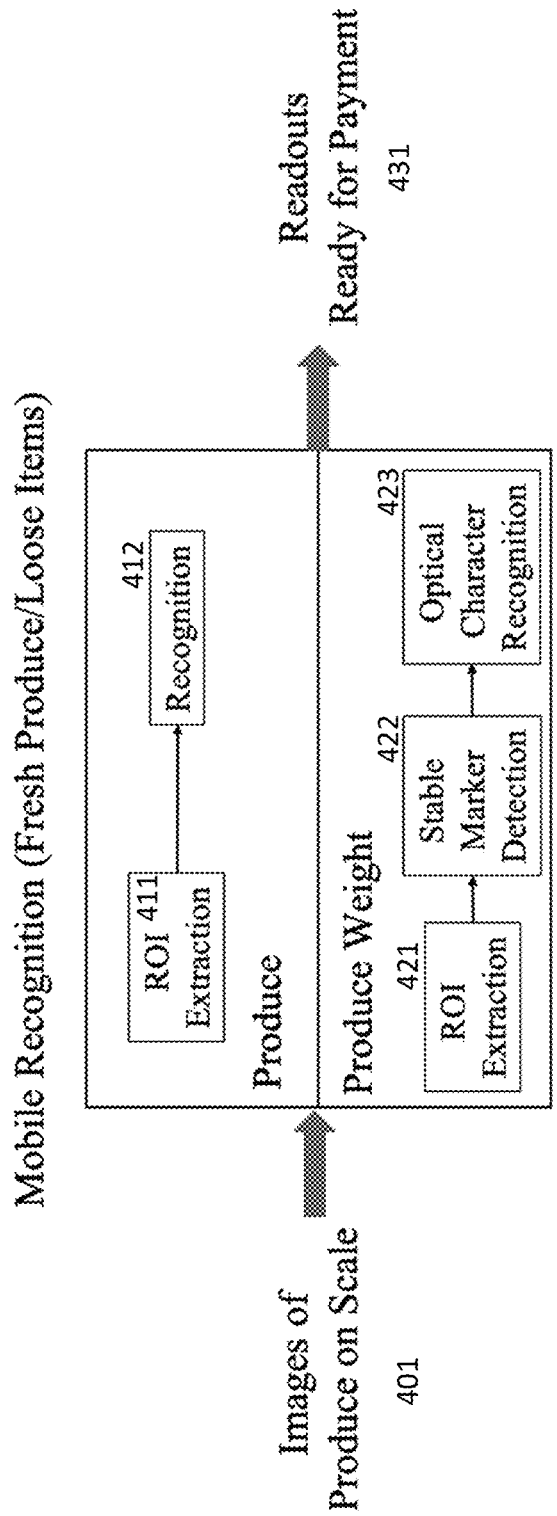
FIG. 4 is a schematic description of a method of image recognition, according to an embodiment.

FIG. 4 is a schematic description of a method of image recognition, according to an embodiment. A recognition device can receive or capture an image of produce 401 on a scale and analyze the image. In some implementations, the recognition device can receive or capture a video of produce on a scale and analyze the video, a frame of the video, or a set of frames of the video. The recognition device (similar to the recognition device 101 as shown and described with respect to FIG. 1) can extract a first region of interest (ROI) image 411 and a second ROI images 421 from the image of produce. The first ROI image 411 shows a produce item and the second ROI image 421 shows a weight of the produce time. The recognition device can then perform recognition 412 on the first ROI image 411 to generate a representation of the produce (e.g., "organic red onion"). The recognition device can perform stable marker detection 422 and/or optical character recognition 423 on the second ROI image 421 to generate a representation of the weight (e.g., "117 grams"). The representation of the produce and the representation of the weight can be part of readouts 431 from which the recognition device or a compute device of a sales representative can use to calculate a price and process a payment.

Figure 5:
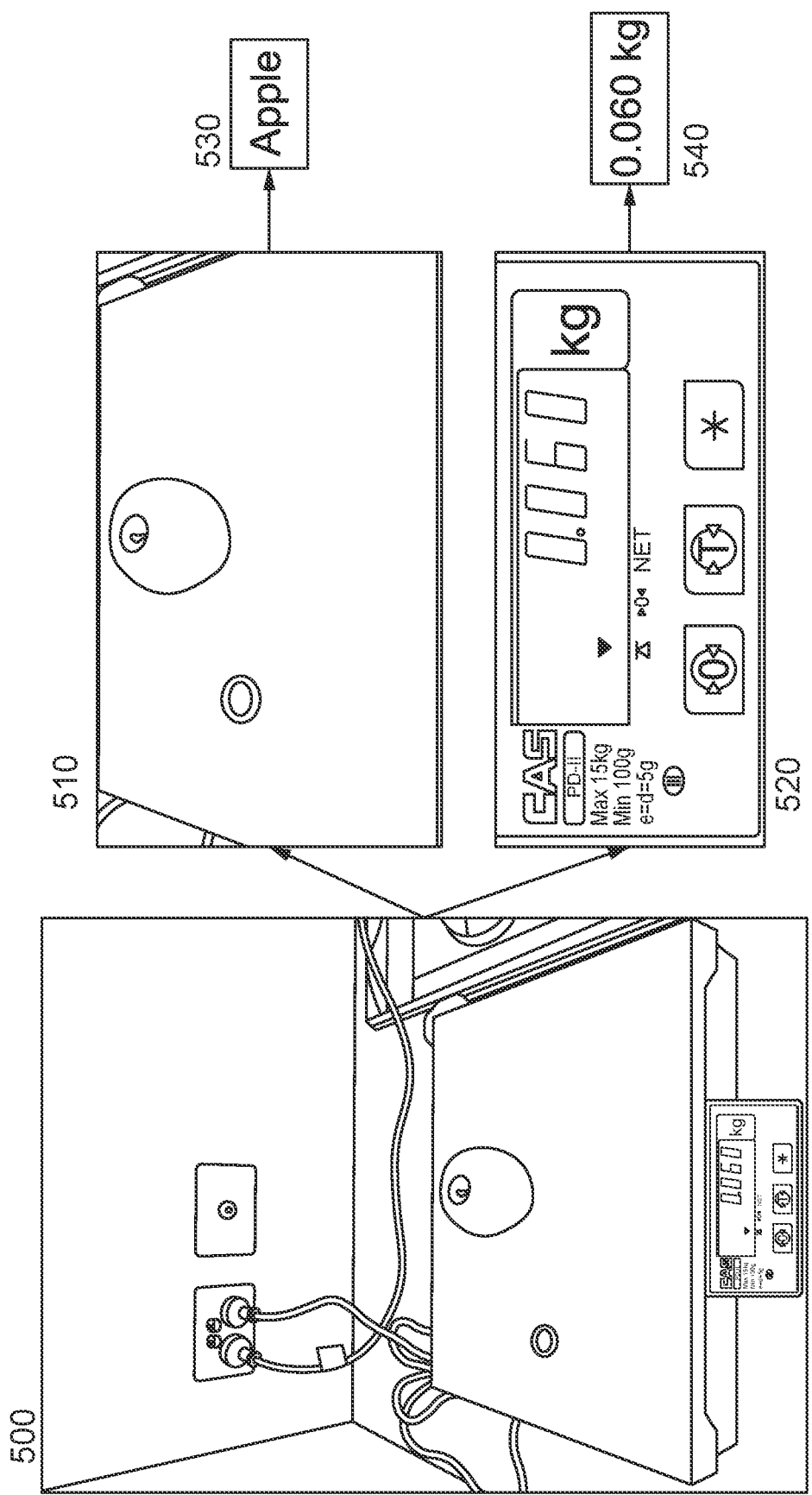
FIG. 5 shows an example of using a recognition device, according to an embodiment.

FIG. 5 shows an example of image recognition and information recognition, according to an embodiment. As shown, a first model (e.g., the first model as shown and described with respect to FIG. 1) can be used in a recognition device (such as recognition device 101 as shown and described with respect to FIG. 1) to identify and extract a first region of interest (ROI) 510 and a second ROI 520 in an image 500. In some instances, the first ROI includes an image of an item (e.g., produce) and the second ROI includes an image of information about the item (e.g., weight of the item, volume of the item, number of items, etc.). For example, the image 500 can include an apple on a scale that shows the weight of the apple. A second model (e.g., the second model as shown and described with respect to FIG. 1) can be used to identify the item and generate a representation of the item 530 (e.g., a string 'Apple') on the first ROI 510. A third model can be used to read the information (e.g., weight of the item displayed in the image) about the item on the second ROI 520 and generate a representation of the information 540 (e.g., a number "0.060") of the second ROI 520.

In some implementations, the information about the item can optionally include a description (e.g., a unit) about the information. For example the third model can be used to extract a string "kg" and a number "0.060" from the second ROI 520 that further specifies a unit for the number. In some implementations, the recognition device can optionally calculate a price of the item based on the representation of the item, the representation of the information, and/or a description about the information.

Although, in some embodiments, methods and apparatus for image recognition are describe in the context of identifying produce and weight of the produce, in some embodiments, the methods and apparatus for image recognition can be used to identify any item and any information about the item. For example, in some embodiments, the item can include a bag, a dress, milk, a rice cooker, a car, and/or the like, and the information about the item, can include weight, volume, number, car model, car mileage, a tag, a bar code, and/or the like.

It should be understood that the disclosed embodiments are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. Thus, it is to be understood that other embodiments can be utilized and functional, logical, operational, organizational, structural and/or topological modifications may be made without departing from the scope of the disclosure. As such, all examples and/or embodiments are deemed to be non-limiting throughout this disclosure.

Some embodiments described herein relate to methods. It should be understood that such methods can be computer implemented methods (e.g., instructions stored in memory and executed on processors). Where methods described above indicate certain events occurring in certain order, the ordering of certain events can be modified. Additionally, certain of the events can be performed repeatedly, concurrently in a parallel process when possible, as well as performed sequentially as described above. Furthermore, certain embodiments can omit one or more described events.

All definitions, as defined and used herein, should be understood to control over dictionary definitions, definitions in documents incorporated by reference, and/or ordinary meanings of the defined terms.

Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using Python, Java, JavaScript, C++, and/or other programming languages, packages, and software development tools.

The drawings primarily are for illustrative purposes and are not intended to limit the scope of the subject matter described herein. The drawings are not necessarily to scale; in some instances, various aspects of the subject matter disclosed herein can be shown exaggerated or enlarged in the drawings to facilitate an understanding of different features. In the drawings, like reference characters generally refer to like features (e.g., functionally similar and/or structurally similar elements).

The acts performed as part of a disclosed method(s) can be ordered in any suitable way. Accordingly, embodiments can be constructed in which processes or steps are executed in an order different than illustrated, which can include performing some steps or processes simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method comprising:
executing, at a first compute device, a first model to extract a first region of interest (ROI) image and a second ROI image from an image that shows a produce and an indication of information associated to the produce, the first ROI image including a portion of the image showing the produce and the second ROI image including a portion of the image showing the indication of information;
executing a second model to identify the produce from the first ROI image and generate a representation of the produce;
executing a third model to read the indication of information associated to the produce from the second ROI image and generate a representation of information;
executing a fourth model to classify the produce from the first ROI image to a bagged produce or a non-bagged produce; and
transmitting the representation of the produce and the representation of information to a second compute device remote from the first compute device, the second compute device configured to calculate a price of the produce based on the representation of information.

2. The method of claim 1, wherein the price is a first price of the produce, the method further comprising:
calculating, at the first compute device, a second price of the produce based on the representation of information.

3. The method of claim 1, wherein the third model includes at least one of a marker detection model or an optical character recognition (OCR) model.

4. The method of claim 1, wherein the third model includes an image recognition model, the method further comprising:
identifying at least one of an indication of a sequence of letters or an indication of a sequence of numbers in the second ROI image;
converting the indication of sequence of letters to text data or the indication of sequence of numbers to numerical data; and
generating the representation of information based on the text data and the numerical data.

5. The method of claim 1, wherein the second model identifies an item of a first type and an item of second type, the method further comprising at least one of the following, before executing the third model:
generating a warning message about identification of multiple types of items;
sending a signal to a compute device of a sales representative about the identification of multiple types of items; or
triggering validation of the identification of multiple types of items.

6. The method of claim 1, wherein the representation of the produce is a text data, the method further comprising:
executing a text-to-speech model to convert the text data to speech data; and
playing back the speech data at the first compute device.

7. An apparatus, comprising:
a memory; and
a processor operatively coupled to the memory, the processor configured to:
execute a first model to extract a first region of interest (ROI) from an image and a second ROI image from the image, the image showing a produce and an indication of information associated to the produce the first ROI image including a portion of the image showing the produce and the second ROI image including a portion of the image showing the indication of information;
execute a second model to identify the produce from the first ROI image and generate a representation of the produce;
execute a third model to read the indication of information associated to the produce from the second ROI and generate a representation of information; and
execute a fourth model to classify the produce from the first ROI image to a bagged produce or a non-bagged produce.

8. The apparatus of claim 7, the processor further configured to:
transmit, via an application programming interface (API), the representation of the produce from the first ROI image and the representation of information from the second ROI image to a compute device remote from the apparatus to cause the compute device to calculate a price of the produce based on the representation of information and the representation of the produce.

9. The apparatus of claim 7, the processor further configured to:
calculate a price of the produce based on the representation of information and the representation of the produce.

10. The apparatus of claim 7, wherein the second model identifies an item of a first type and an item of second type, the method further comprising at least one of the following, before executing the third model:
generating a warning message about identification of multiple types of items;
sending a signal to a compute device of a sales representative about the identification of multiple types of items; or
validating the identification of multiple types of items.

11. The apparatus of claim 7, wherein the representation of the produce is a text data, the method further comprising:
executing a text-to-speech model to convert the text data to speech data; and
playing back the speech data at the first compute device.

12. The apparatus of claim 7, wherein the second model includes a convolutional neural network model (CNN).

13. The apparatus of claim 7, wherein the third model includes at least one of a marker detection model and an optical character recognition (OCR) model.

14. The apparatus of claim 7, wherein the third model includes an image recognition model, the processor further configured to:
identify at least one of an indication of a sequence of letters or an indication of a sequence of numbers in the second ROI image;
convert the indication of sequence of letters to text data or the indication of sequence of numbers to numerical data; and
generate the representation of information based on the text data and the numerical data.

15. A method comprising:
recording, at a first compute device, an image showing an item and an indication of information associated to the item; and
executing a machine learning model to:
extract a first region of interest (ROI) including a portion of the image with the item,
identify the item from the first ROI and generate a representation of the item,
extract a second ROI including a portion of the image with the indication of information,
identify at least one of an indication of a sequence of letters associated with a scale or an indication of a sequence of numbers associated with the scale, in the indication of the information in the second ROI image,
convert at least one of (1) the indication of sequence of letters associated with the scale to text data or (2) the indication of sequence of numbers associated with the scale to numerical data, and
generate a representation of information based on at least one of the text data or the numerical data.

16. The method of claim 15, further comprising:
transmitting, via an application programming interface (API), the representation of the item from the first ROI image and the representation of information associated with the second ROI image to a second compute device remote from the first compute device, the second compute device configured to:

calculate a price of the item based on the representation of information and the representation of the item, and transmit a representation of the price to the first compute device; and displaying an indication of the price to a user of the first compute device.

17. The method of claim 15, wherein the item is produce.
18. The method of claim 15, further comprising:

calculating a price of the item based on the representation of information and the representation of the item.

* * * * *